Dec. 5, 1933.  H. LYON  1,938,394
METHOD OF AND APPARATUS FOR CUTTING LAMINATED MATERIAL
Filed Dec. 3, 1931
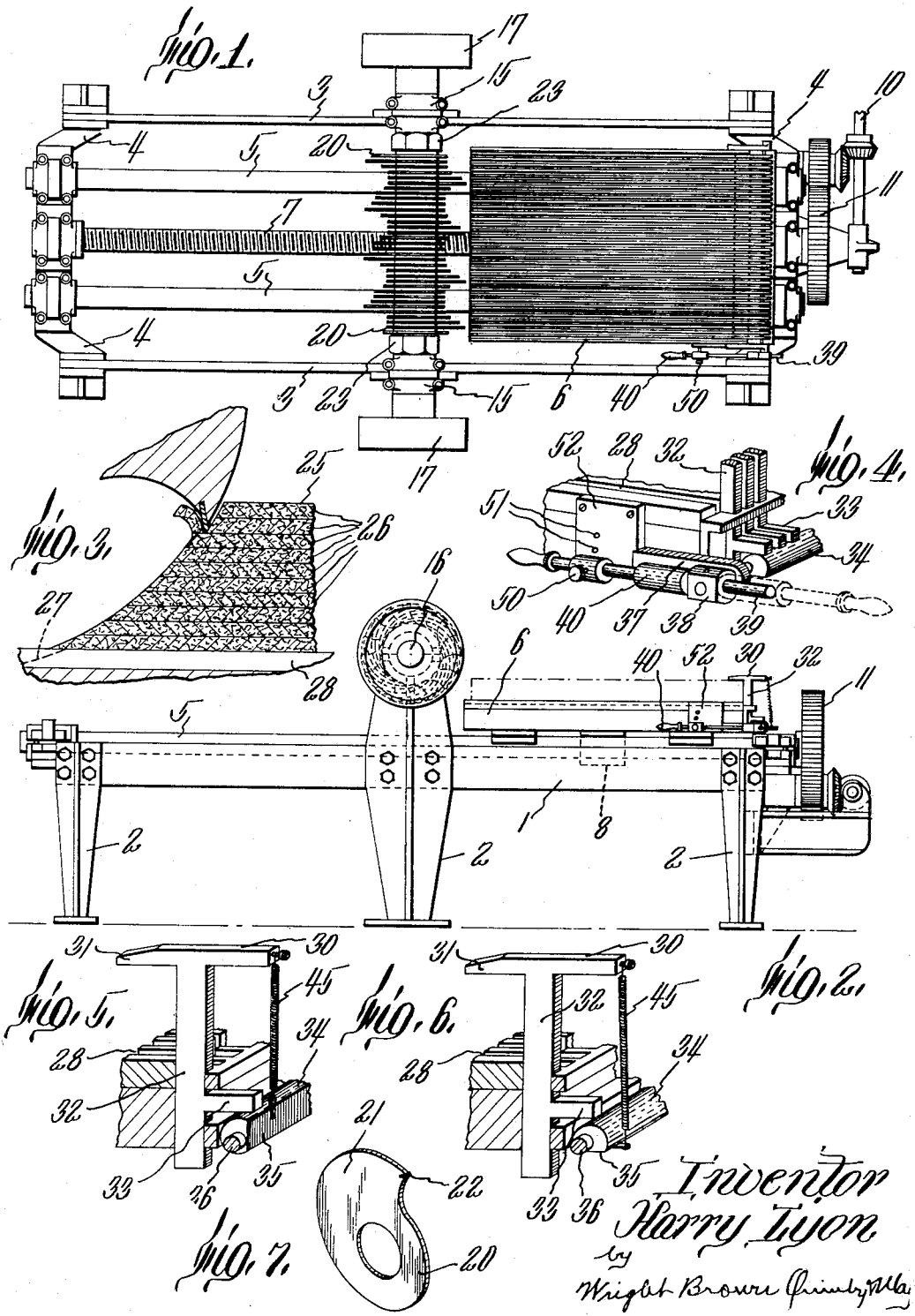

Patented Dec. 5, 1933

1,938,394

UNITED STATES PATENT OFFICE 1,938,394

METHOD OF AND APPARATUS FOR CUTTING LAMINATED MATERIAL

Harry Lyon, Brockton, Mass., assignor to George O. Jenkins Company, Bridgewater, Mass., a corporation of Massachusetts Application December 3, 1931. Serial No. 578,713

6 Claims. (Cl. 164—60)

This invention relates to the cutting of laminated material across the planes of the laminations, and more particularly to laminated material comprising fibrous material in which the planes of cutting lie in general across the fibers. While not restricted thereto, this invention has been developed to meet the particular difficulties and problems of cutting composition material of this type which contains in addition to the fibrous material, which has been felted on a paper or boardmaking machine, various other materials such as waterproofing compositions or the like, and the various fillers which are often employed in connection with the felting of paper on a paper or wet machine.

More particularly this invention has for its particular purpose to cut such material into slabs of uniform thickness suitable for use as flooring. Material of this general description is disclosed in the Denning Patents No. 1,555,913 and No. 1,555,914 for Floor and process of making the same, and Floor and process of laying floors, both granted October 6, 1924, the fibrous material being preferably saturated with a waterproofing and the laminations being adhesively secured together before being cut but preferably being laid without the use of fastening devices by cementing to the floor. This material is very difficult to cut, the fibrous material and the various fillers which it contains rapidly dulling cutting edges so that only those of the most resistant nature, such as the so called high speed alloys of the nature of tungsten carbide or the like are reasonably serviceable. Moreover, the composition is of a somewhat rubbery nature, the cut portions being rather easily deflected laterally, which, if permitted would cause successive cuts to produce an uneven cut surface. There is also considerable liability of separating the laminations, the bond between them being much weaker than the bond of the material within the individual laminations. It is found in practice also that if one edge of the cutter is slightly sharper or is more freely cutting than the other the cut will move progressively in the direction of the more freely cutting side so that the cut faces will not be true. As it is not feasible and indeed is practically impossible to maintain a plurality of cutters in exactly equal degrees of sharpness or cutting freeness on opposite faces, each cut according to this invention, is made by a single cutting element only. In order to minimize the tendency for the laminations to be separated, the cutter is presented to one face of the block to be cut substantially perpendicular to the laminations while he opposite face of the block is being firmly supported, and the cutter is withdrawn from the opposite face of the block in a direction as nearly in line with the plane of the laminations as practicable.

It is also preferable to cut by a gang of cutters arranged to divide the whole block into slabs at once, not only to increase the capacity of the cutting machine but also to cut on both faces of each slab at once, in order to substantially equalize the pressure of cutters on opposite faces thereof tending to bend the slab in opposite directions, and to cause the material on each side of each cutter to offer substantially equal resistances to the cutting tools. It is also desirable to form each cutter with a guide portion which continually extends between the slabs as they are cut, but with ample chip clearing space, to support the slabs against the possibility of excessive bending.

This invention also relates to certain other improvements in mechanism for effecting cutting operations and more particularly for holding the block to be cut against a work table.

For a more complete understanding of this invention, reference may be had to the accompanying drawing in which Figure 1 is a top plan of the machine.

Figure 2 is a side elevation thereof.

Figure 3 is a diagrammatic detail section showing the action of one of the cutters on the work.

Figure 4 is a fragmentary perspective showing a portion of the work hold-down mechanism.

Figures 5 and 6 are fragmentary perspectives of the work-hold down in raised and lowered positions, respectively.

Figure 7 is a perspective of one of the cutters.

Referring to the drawing, 1 indicates a bed of any suitable description mounted on suitable legs 2 elevated from the floor. This table, as shown, is of skeleton form having spaced side frame members 3 and end members 4, and supported in these end members are the guide rods or bars 5 on which is slidably mounted a work table 6. In order to feed this work table lengthwise of the bars 5 a threaded bar 7 is shown, also journaled in the end frame members 4 and having suitable engagement with a nut 8 secured to the table. The threaded shaft 7, which acts as a lead screw, may be driven by any suitable means from a shaft 10, such means, as shown, including the gearing at 11. Certain of the legs 2 may be extended above the frame portion 1 to support bearings 15 for a shaft 16 which extends transversely of the work table. This shaft may have suitable driving belt pulleys 17 secured to one or both ends by which it may be rotated and on this shaft is arranged a plurality of cutters 20, one of which is shown detached in Figure 7.

These cutters, as shown in Figure 1, are arranged along the shaft, being suitably spaced apart the width of the desired thickness of the slabs which are to be cut, and they may be clamped in such relation so as to be rotated with the shaft 16 as by means of the nuts 23 on threaded portions thereof immediately inwardly of the bearings 15. Each of the cutters, as shown in Figure 7, comprises a disk 20 having at one side a radial extension 21 which supports a single cutting element 22. This is preferably of very hard material, such as one of the high speed alloys as tungsten carbide or the like, which are now used for metal cutting. As shown in Figures 1 and 2 also, these cutters are arranged so that the cutting elements of adjacent cutters are angularly spaced from each other so that all do not begin to cut at the same time in the rotation of the shaft, thus to distribute the cutting stresses more evenly throughout the rotation of the shaft.

At 25 in Figure 3 is shown a portion of the block of laminated material carried on the upper face of the work table 6, the axis of the shaft 16 being arranged at such a distance above the top of the table 6 that as each cutter approaches its upper face it has a large component of motion perpendicular to the planes of the laminations 26 of the block 25. Thus as each cutter enters the upper face of the work it exerts a strong downward pressure, tending to hold the laminations together, this pressure being resisted by the support of the block on the work table over a substantial area beneath each cutting element. As the cutter passes through the block, however, the cutter approaches more and more a cutting direction approaching parallelism with the planes of the laminations so that when it emerges from the lower face of the block its motion has a very large component parallel to the planes of the laminations as shown by a dotted line 27 in Figure 3. The upper face of the work table is slotted to permit the cutting elements to pass out from the lower face of the block but the pressure of the tool as it emerges from this face having such a large component lengthwise of the lamination and such a small component transversely of the lamination has little effect to tend to separate the lower lamination from those above by pushing it into the slots 28 of the work table, so that the cutting is effected without injuring the bond between the various laminations. Due to the difficulty of cutting material of this nature across the fibers, the cutting pressures are relatively heavy considering the rather limited strength of the bond between the laminations, so that the direction of cutting stresses is of material importance.

The downward pressure exerted by the cutters being considerable, aids materially in holding the work down firmly on the work table rendering it unnecessary to use other means except at points relatively remote from the cutters as at the end of the block most remote therefrom.

It is also important that each cutting element have its edges formed of substantially equal sharpness and cutting freeness as otherwise the tool has a strong tendency to move in the work toward the more freely cutting side, and as the work is held down to the bed this would cause bending of the slabs as cut and the cutting of them to non-uniform thicknesses. Any tendency in this direction, however, can be noted and rectified in each cutting element by a honing or similar method. It will be noted, moreover, that each of the disks 20 has its outer edge projecting from the shaft sufficiently so as to be maintained in the kerf cut by the cutter, thus to prevent excessive bending of each slab through its resultant continuous engagement with this portion of the cutter, and as it would be impossible to insure a plurality of cutting elements being equally free cutting on both sides a single cutting element only is used for each cutter.

The hold-down mechanism, as shown more particularly in Figures 2, 4, 5 and 6, comprises a plurality of hold-down fingers 30, each having a portion 31 overlying one edge of the block to be cut and a shank portion 32 against which this edge of the block 25 may be positioned. Each finger also has an extension 33 which overlies a cam 34 in the form of an eccentrically pivoted roller having one side cut away as at 35. The turning axis of the roller as at 36 projects through suitable bearings as 37 at opposite sides of the table and at one side it is provided with a member 38 provided with oppositely extending posts 39 over which may be placed handle elements such as 40. Each of the fingers is normally pulled downwardly independently of all the others to hold its extension 33 against the cam 34 or the portion 31 against the upper face of the block when the block is in position, as by means of a spring 45. The fingers thus adjust themselves individually to irregularities of block thickness. When the cam is turned into the position shown in Figure 5 all the fingers are thus simultaneously lifted by the engagement of the cam on the extensions 33 so as to permit the insertion of a block to be cut or the removal of the slabs from beneath the portions 31. Then by rotation of the cam to the position shown in Figure 6 the springs 45 may draw the portions 31 into clamping engagement with the upper face of the block, these fingers being spaced to permit the cutters to pass therebetween so that the block may be cut from end to end without interference by the hold-down mechanism.

Any suitable means may be provided for holding the cam in the position shown in Figures 4 and 6 to permit the portions 31 to engage the upper face of the block. As shown a handle 40 engaged with the member 38 may be provided with a locking pin 50 for engaging in a suitable perforation such as 51 in a plate member 52 secured to the work table 6, and because of interference from the side rail 3 the cam member 34 without the handle may be moved into this position by placing a similar handle member over the other extension 39 and turning it down to the dotted line position in Figure 4, whereupon the handle shown in full lines in this figure may be placed in position and locked to the plate 52, and the handle shown in dotted lines in Figure 4 may be removed.

From the foregoing description of the method and a machine in which this invention is embodied it should be evident to those skilled in the art that various changes and modifications might be made without departing from the spirit or scope of this invention as defined by the appended claims.

I claim:

1. The method of cutting laminated material across the laminations into slabs, which comprises successively forcing a plurality of cutters each having a single cutting element only into the material from one face with a large component of pressure directed perpendicular to the planes of the laminations, said cutters being spaced apart the thickness of the desired slabs, and while supporting the opposite face of the material, and forcing through and withdrawing said cutting elements from said opposite face in directions close to parallel to said planes while supporting the cut portions of the slabs against excessive lateral bending.

2. A machine of the class described comprising a work table, a shaft arranged transversely of said table, a gang of cutters fixed in spaced relation along said shaft, each cutter having a single cutting element only, the several cutting elements being spaced angularly about the axis of said shaft, means for holding a block of material to be cut on said work table, means for rotating said shaft, and means for feeding said cutters and table relatively to cause said cutters to cut the work into a plurality of slabs.

3. A machine of the class described comprising a work table, a shaft arranged transversely of said table, a gang of cutters fixed in spaced relation along said shaft, a plurality of work holders for holding a block of material to be cut against said table, each of said holders having a portion overlying one edge of the block and having a shank portion against which the edge of the block may be presented, said holders being positioned corresponding to the spaces between said cutters, spring means for pressing said holders against the upper face of said block, and means actuable manually to raise all of said holders from the block simultaneously.

4. A machine of the class described comprising a work table, a shaft arranged transversely of said table, a gang of cutters fixed in spaced relation along said shaft, a plurality of work holders for holding a block of material to be cut against said table, said holders being positioned corresponding to the spaces between said cutters and each paving a portion overlying one edge of the block, spring means for individually pressing said holders against the upper face of said block, means actuable to raise all of said holders from said block simultaneously, and means for retaining said raising means in inoperative relation.

5. A machine of the class described comprising a work table, a plurality of work hold-down fingers spaced along one edge of said table, each of said fingers having an extension, a cam extending beneath said extensions, a spring pulling each of said fingers downwardly, and means actuable to rotate said cam to simultaneously raise all of said fingers.

6. A machine of the class described comprising a work table, a shaft arranged transversely of said table, a gang of cutters fixed in spaced relation along said shaft, each cutter comprising a disk carrying a single cutting element, means for rotating said shaft, and means for relatively feeding said table and shaft in relation to cause said elements to cut kerfs therein continuously occupied by said disks.

HARRY LYON.